United States Patent [19]

Togano et al.

[11] Patent Number: 5,587,211

[45] Date of Patent: Dec. 24, 1996

[54] LIQUID CRYSTAL DEVICE AND LIQUID CRYSTAL APPARATUS INCLUDING SAME

[75] Inventors: Takeshi Togano, Yokohama; Hideaki Takao, Machida; Masanobu Asaoka, Yokohama; Makoto Kojima, Atsugi, all of Japan

[73] Assignee: Canon Kabushiki Kaisha, Tokyo, Japan

[21] Appl. No.: 423,101

[22] Filed: Apr. 18, 1995

[30] Foreign Application Priority Data

Apr. 18, 1994 [JP] Japan ..................... 6-101717

[51] Int. Cl.$^6$ ............................. G02F 1/1337
[52] U.S. Cl. ......................... 428/1; 349/123
[58] Field of Search ................... 428/1; 359/75–79

[56] References Cited

U.S. PATENT DOCUMENTS

| | | | |
|---|---|---|---|
| 4,367,924 | 1/1983 | Clark et al. | 350/334 |
| 4,561,726 | 12/1985 | Goodby et al. | 350/341 |
| 4,802,743 | 2/1989 | Takao et al. | 350/339 F |
| 4,818,075 | 4/1989 | Takao et al. | 350/339 F |
| 4,917,471 | 4/1990 | Takao et al. | 350/339 F |
| 5,078,475 | 1/1992 | Sekimura et al. | 359/68 |
| 5,080,938 | 1/1992 | Uekita et al. | 428/1 |
| 5,129,727 | 7/1992 | Hanyu et al. | 359/75 |
| 5,192,596 | 3/1993 | Hanyu et al. | 428/1 |
| 5,221,981 | 6/1993 | Kodera et al. | 359/76 |
| 5,250,330 | 10/1993 | Asaoka et al. | 428/1 |
| 5,268,780 | 12/1993 | Hanyu et al. | 359/75 |
| 5,316,805 | 5/1994 | Hanyu et al. | 428/1 |
| 5,320,883 | 6/1994 | Asaoka et al. | 428/1 |
| 5,325,219 | 6/1994 | Hanyu et al. | 359/78 |
| 5,326,600 | 7/1994 | Asaoka et al. | 428/1 |
| 5,330,803 | 7/1994 | Takoa et al. | 428/1 |
| 5,332,603 | 7/1994 | Nozawa et al. | 428/1 |
| 5,381,256 | 1/1995 | Hanyu et al. | 359/75 |
| 5,400,159 | 3/1995 | Takoa et al. | 359/76 |
| 5,419,931 | 5/1995 | Asaoka et al. | 428/1 |
| 5,419,932 | 5/1995 | Togano et al. | 428/1 |

FOREIGN PATENT DOCUMENTS

| | | |
|---|---|---|
| 0362861 | 4/1990 | European Pat. Off. . |
| 0409228 | 1/1991 | European Pat. Off. . |
| 2604293 | 8/1977 | Germany . |
| 56-107216 | 8/1981 | Japan . |
| 2144232 | 2/1985 | United Kingdom . |

OTHER PUBLICATIONS

Patent Abstracts of Japan, vol. 11, No. 62 (Feb. 25, 1987) P–551.
Patent Abstracts of Japan, vol. 7, No. 192 (Aug. 23, 1983) P–218.
Patent Abstracts of Japan, vol. 17, No .654 (Dec. 3, 1993) P–1653.
Patent Abstracts of Japan, vol. 18, No. 373 (Jul. 13, 1994) P–1769.
T. J. Scheffer and J. Nehring, A New, Highly Multiplexable Liquid Crystal Display, Nov. 15, 1984, Applied Physics Letters, vol. 45, No. 10, pp. 1021–1023.
M. Schadt and W. Helfrich, Voltage–Dependent Optical Activity of Twisted Nematic Liquid Crystal, Feb. 15, 1971, Applied Physics Letters, vol. 18, No. 4, pp. 127–128.
Yoshida, Preprint for Liquid Crystal Forum (Oct. 1987) pp. 142–143.

Primary Examiner—Alexander Thomas
Attorney, Agent, or Firm—Fitzpatrick, Cella, Harper & Scinto

[57] ABSTRACT

A liquid crystal device is constituted by a pair of substrates each having an electrode thereon and disposed in parallel with each other, and a liquid crystal disposed between the substrates. At least one of the substrates has thereon an organic alignment film formed from at least one species of polymer including a polymer having an average molecular weight of at most 30,000.

10 Claims, 8 Drawing Sheets

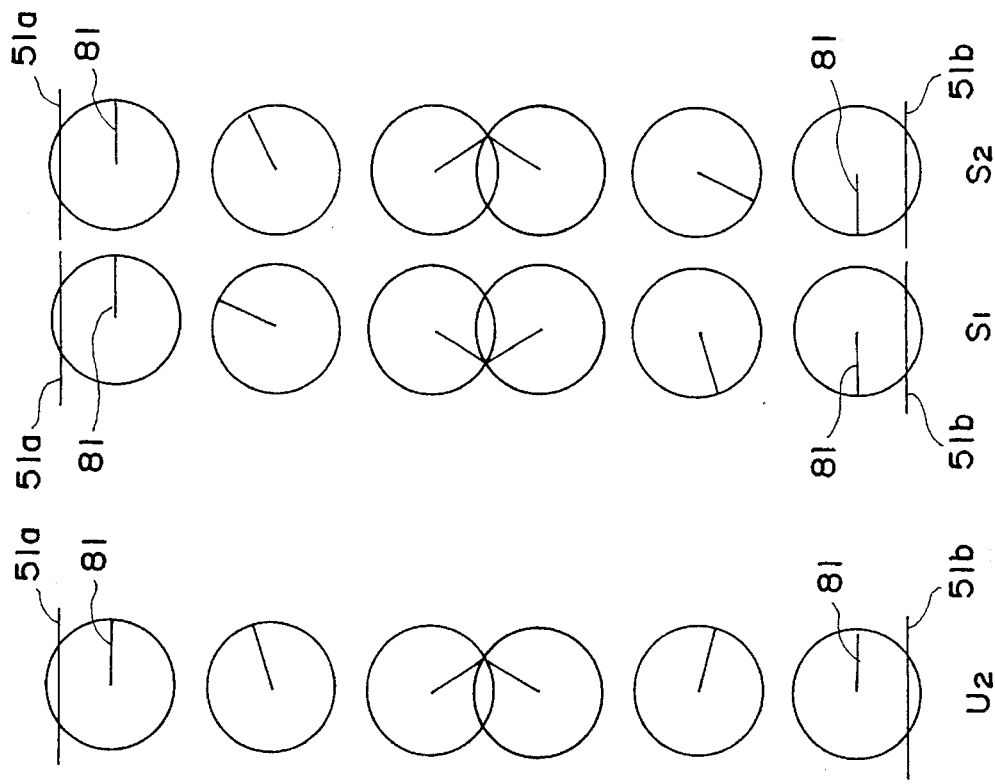
FIG. 6
FIG. 5
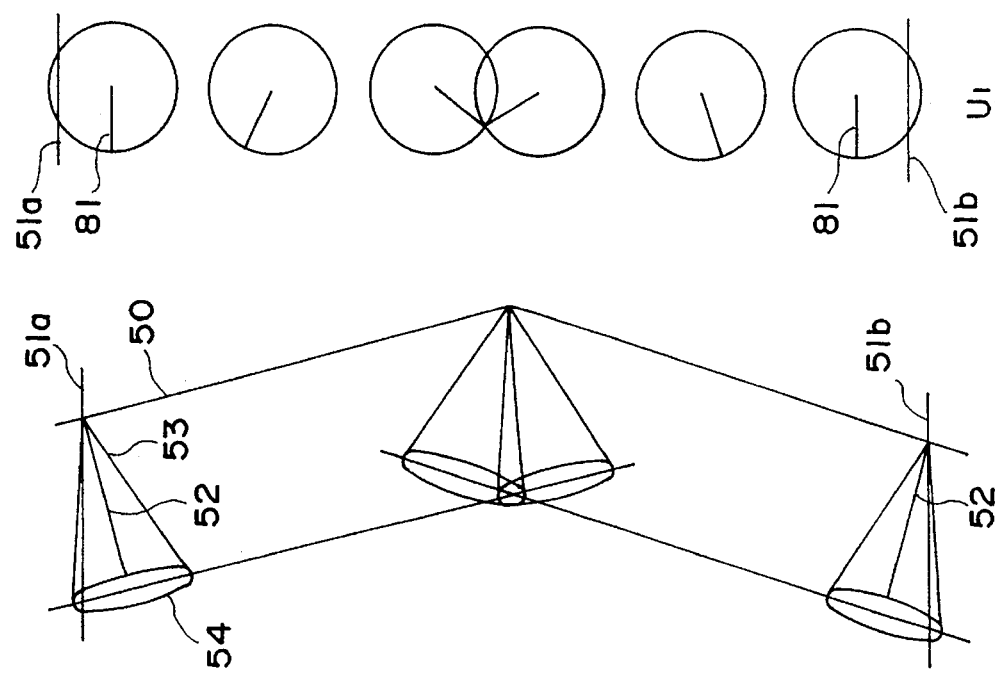
FIG. 4

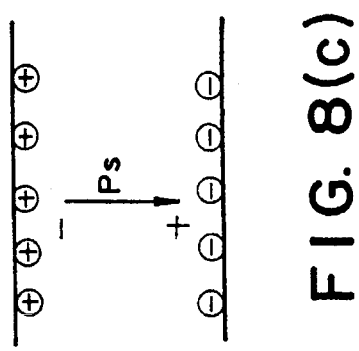
FIG. 8(b)
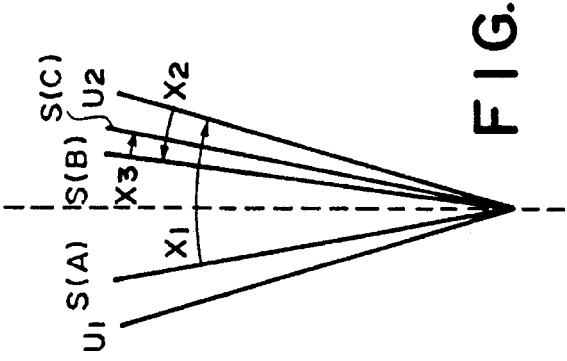
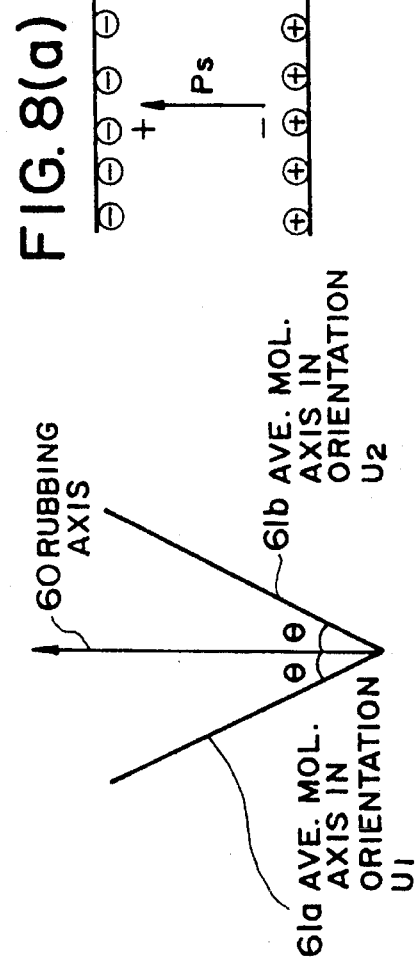
FIG. 8(a)
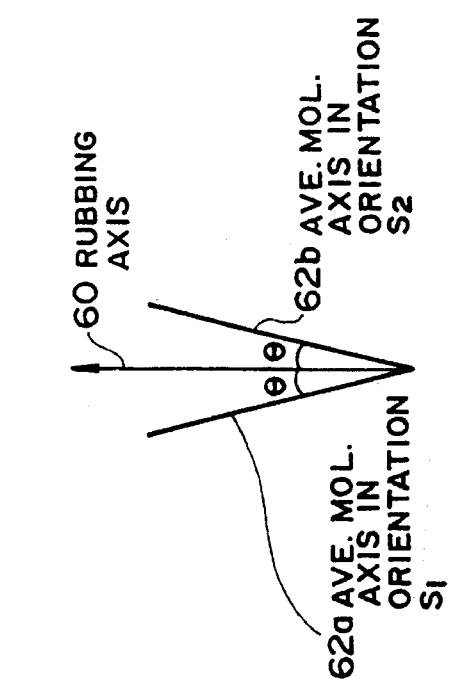
FIG. 9
FIG. 7A
FIG. 7B

LIQUID CRYSTAL DEVICE AND LIQUID CRYSTAL APPARATUS INCLUDING SAME

FIELD OF THE INVENTION AND RELATED ART

The present invention relates to a liquid crystal device for use in a liquid crystal display apparatus, a liquid crystal-optical shutter, etc., particularly a liquid crystal device using a chiral smectic liquid crystal, preferably a ferroelectric liquid crystal. More specifically, the present invention relates to a liquid crystal device having an improved alignment state of liquid crystal molecules and a liquid crystal apparatus, such as a liquid crystal display apparatus, including the liquid crystal device.

Hitherto, a liquid crystal device has been widely used as an electrooptical device in various fields. Liquid crystal devices practically used at present include those using TN (twisted nematic)-type liquid crystals, as disclosed by M. Schadt and W. Helfrich, Applied Physics Letters, Vol. 18, No. 4 (1971), page 127-. When this type of liquid crystal device is driven according to a mutiplex drive scheme, however, the image contrast is lowered as the number of scanning lines is increased so that it is difficult to provide a large capacity display.

As a type of liquid crystal device solving the above-mentioned problem, there has been proposed a super-twisted birefringence (SBE)-type liquid crystal display device wherein liquid crystal molecules are further twisted to be used for display by utilizing birefringence of the liquid crystal by T. J. Scheffer and J. Nehrig, Applied Physics Letters, Vol. 45 (1984), page 1021-.

When a conventional alignment film providing a small tilt angle is used in the SBE-type liquid crystal display device, however, a scattering domain occurs. For this reason, an alignment film realizing a large tilt angle has been required.

On the other hand, a display device of the type which controls transmission of light in combination with a polarizing device by utilizing the refractive index anisotropy of ferroelectric liquid crystal molecules has been proposed by Clark and Lagerwall (Japanese Laid-Open Patent Application (JP-A) 56-107216, U.S. Pat. No. 4,367,924). The ferroelectric liquid crystal has generally chiral smectic C phase (SmC*) or H phase (SmH*) of a non-helical structure (i.e., a structure wherein a helical alignment of liquid crystal molecules in a smectic layer normal direction has been released) and, in the SmC* or SmH* phase, shows a property of assuming either one of a first stable state and a second stable state responding to an electrical field applied thereto and maintaining such a state in the absence of an electrical field, namely bistability, and also has a quick responsiveness to the change in electrical field. Thus, it is expected to be utilized in a high speed and memory type display device and particularly to provide a large-area, high-resolution display in view of its excellent function.

For an optical modulating device using such a liquid crystal having at least two stable states to exhibit desirable driving characteristics, it is required that the liquid crystal disposed between a pair of substrates should be in such a molecular alignment state that conversion between the above two stable states may occur effectively irrespective of the application of an electrical field.

Further, in a liquid crystal device utilizing birefringence of a liquid crystal, the transmittance under right angle cross nicols is given by the following equation:

$$I/I_0 = \sin^2 4\theta \cdot \sin^2(\Delta n \cdot d/\lambda)\pi,$$

wherein $I_O$: incident light intensity,

I: transmitted light intensity,

θ: tilt angle,

Δn: refractive index anisotropy, d: thickness of the liquid crystal layer,

λ: wavelength of the incident light.

The tilt angle θ in the above-mentioned non-helical structure is recognized as a half of an angle between the average molecular axis directions of liquid crystal molecules in a twisted alignment in a first orientation state and a second orientation state. According to the above equation, it is shown that a tilt angle θ of 22.5 degrees provides a maximum transmittance and the tilt angle θ in a non-helical structure for realizing bistability should desirably be as close as possible to 22.5 degrees in order to provide a high transmittance and a high contrast.

A method for aligning a ferroelectric liquid crystal should desirably be such that molecular layers each composed of a plurality of molecules of a smectic liquid crystal are aligned uniaxially along their normals, and it is desirable to accomplish such an alignment state through a simple production step. For example, it is desirable to form a polymer film at a boundary surface with the liquid crystal of a liquid crystal cell and rub the polymer film to form an alignment film.

As an alignment method for a ferroelectric liquid crystal, particularly a chiral smectic liquid crystal in a non-helical structure, one disclosed in U.S. Pat. No. 4,561,726 has been known for example.

However, when a conventional alignment method, particularly one using a polymer film treated by rubbing, is applied for alignment of a ferroelectric liquid crystal in a non-helical structure exhibiting bistability reported by Clark and Lagerwall, the following problems are encountered.

That is, according to our experiments, it has been found that a tile angle θ (an angle shown in FIG. 3 as described below) in a ferroelectric liquid crystal with a non-helical structure obtained by alignment with an alignment control film of the prior art has become smaller as compared with a tilt angle Ⓗ (the angle Ⓗ is a half of the apex angle of the cone shown in FIG. 2 as described below) in the ferroelectric liquid crystal having a helical structure. Particularly, the tilt angle θ in a ferroelectric liquid crystal with a non-helical structure obtained by alignment with alignment control films of the prior art was found to be generally on the order of 3–8 degrees, and the transmittance at that time was at most about 3 to 5%, thus failing to provide a good contrast.

Thus, according to Clark and Lagerwall, the tilt angle in a ferroelectric liquid crystal with a non-helical structure realizing bistability should have the same angle as the tilt angle in the ferroelectric liquid crystal having a helical structure, but in fact the tilt angle θ in a non-helical structure is smaller than the tilt angle Ⓗ in a helical structure. More specifically, it has been found that the tilt angle θ in a non-helical structure becomes smaller than the tilt angle Ⓗ because of a twist alignment of liquid crystal molecules in the non-helical structure. Thus, in a ferroelectric liquid crystal having a non-helical structure, liquid crystal molecules are aligned with a twist from a molecular axis adjacent to an upper substrate to a molecular axis adjacent to a lower substrate continuously at a certain twist angle δ. This leads to a phenomenon that the tilt angle θ in the non-helical structure is smaller than the tilt angle Ⓗ in the helical structure.

It has been known effective to provide a large pretilt angle (i.e., angle formed by a liquid crystal molecule director with respect to a liquid crystal alignment surface) to remove the twist alignment, thereby providing a larger tilt angle θ in a non-helical structure and an improved contrast. However, the material characteristic for an alignment film providing a large pretilt angle has not been fully clarified.

Further, in an alignment state of a chiral smectic liquid crystal attained by a conventional polyimide alignment film subjected to a rubbing treatment, when a liquid crystal is supplied with a voltage of one polarity for switching from a first optically stable state (e.g., a white display state) to a second optically stable state (e.g., a black display state) and then the voltage of one polarity is removed, the ferroelectric liquid crystal layer is supplied with a reverse electric field Vrev due to the presence of the polyimide film as an insulating layer between the electrode and the liquid crystal layer, and the reverse electric field Vrev has caused an after-image during display. The generation of the above-mentioned reverse electric field has been reported in "Switching characteristic of SSFLC" by Akio Yoshida, "Preprint for Liquid Crystal Forum, October 1987" p.p. 142–143.

SUMMARY OF THE INVENTION

An object of the present invention is to provide a liquid crystal device having solved the above-mentioned problems and realizing a high transmittance by providing a large tilt angle in a non-helical structure of a chiral smectic liquid crystal.

A further object of the present invention is to provide a liquid crystal device suitable for constitution a display apparatus having excellent display characteristics, including capability of providing high-contrast images free from after-image.

A still further object of the present invention is to provide a liquid crystal apparatus including such a liquid crystal device.

According to the present invention, there is provided a liquid crystal device, comprising: a pair of substrates disposed in parallel with each other and each having an electrode thereon, and a liquid crystal disposed between the substrates; at least one of the substrates having thereon an organic alignment film comprising at least one species of polymer having an average molecular weight of at most 30,000.

The present invention further provides a liquid crystal apparatus, inclusive of a display apparatus, including such a liquid crystal device.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIG. 4 is a schematic sectional view showing an alignment state of a chiral smectic liquid crystal aligned according to the present invention.

FIG. 5 is an illustration of C-director alignments in a uniform alignment state.

FIG. 6 is an illustration of C-director alignments in a splay alignment state.

FIGS. 7A and 7B are plan views illustrating tilt angles θ in a uniform alignment state and a splay alignment state, respectively.

FIG. 8 which consists of three connected portions (a), (b) and (c), is a sectional view showing a charge distribution, a direction of a spontaneous polarization $P_S$ and a direction of a reverse electric field Vrev.

FIG. 9 is a schematic plan view illustrating changes in tilt angle θ during and after application of an electric field.

DETAILED DESCRIPTION OF THE INVENTION

Figure 1:
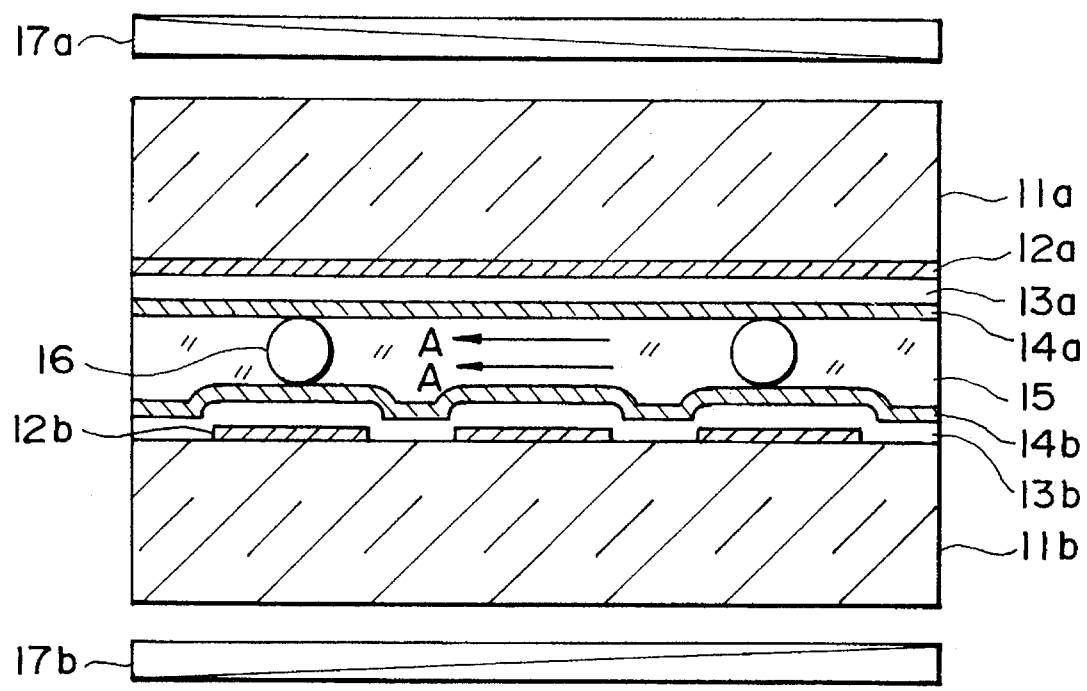
FIG. 1 is a schematic sectional view of an embodiment of the liquid crystal device according to the present invention.

FIG. 1 is a schematic sectional view of an embodiment of the liquid crystal device according to the present invention.

The liquid crystal device comprises a pair of substrates (glass plates), plastic plates, etc. 11a and 11b which are coated with transparent electrodes 12a and 12b of $In_2O_3$, ITO (indium tin oxide), etc., 200–1000 Å-thick insulating films 13a and 13b of $SiO_2$, $TiO_2$, $Ta_2O_5$, etc. of a single layer or plural layers, and specific alignment control films 14a and 14b as described above. The alignment control film may be formed on only one or both of the substrates 11a and 11b.

The alignment control films 14a and 14b may preferably be rubbed in directions which are parallel and in the same direction (indicated by arrows A in FIG. 1). A nematic or chiral smectic liquid crystal 15 is disposed between the substrates 11a and 11b. In the case of using a chiral smectic liquid crystal 15, the spacing between the substrates 11a and 11b may be set to be small enough (e.g., 0.1–3 μm) to suppress the helical alignment structure in the direction of a smectic layer normal so as to provide the ferroelectric smectic liquid crystal with a bistable alignment state. The spacing may also be optimally set for a liquid crystal material other than a ferroelectric smectic liquid crystal. Such a small spacing may be retained by disposing spacer beads 16 of, e.g., silica or alumina.

According to our study, in a liquid crystal device structure as described above, it has been formed effective to use an organic alignment film comprising at least one species of polymer having a molecular weight of at most 30,000, preferably at most 20,000, more preferably at most 10,000, most desirably at most 8,000, to realize an excellent alignment state. Particularly, in case of using a chiral smectic liquid crystal, it is possible to realize a high pretilt alignment state giving a larger tilt angle θ in a non-helical structure and a large optical contrast between the bright and dark states by rubbing the alignment films, as desired. Particularly, in case of multiplexing drive as described in U.S. Pat. No. 4,655,561, it is possible to provide an alignment state giving a large contrast at non-selected pixels and free from optical response delay in switching causing an after-image in display at the time of multiplexing drive.

The term "average molecular weight" used herein refers to a number-average molecular weight based on GPC (gel permeation chromatography) measurement as calibrated by standard polystyrene samples. More specifically, the GPC measurement was performed by using two columns (of "Shodex AD-80 M/S", available from Showa Denko K.K.) and one pre-column (of "Shodex AD-800", ditto) and a solvent DMF (dimethylformamide) (containing 0.6 mol/l of LiBr and 0,004 mol/l of $H_3PO_4$ as a buffer agent) flown at a rate of 1.0 ml/min. The temperature was controlled at 40° C. both at the columns and the injector part. The sample concentration was 0.3% (wt./mol). A differential refractive index detector was used. The GPC measurement was first repeated by using several polystyrene standard molecular weight samples to make a molecular weight calibration curve. Then, the GPC measurement was performed by using respective polymer materials for providing alignment films. In case of a polyimide alignment film material, the corresponding polyamide acid (polyimide precursor) was used as a sample for the GPC measurement.

In the case of using an alignment film comprising a polymer having an average molecular weight of at most 30,000, the resultant alignment characteristic at the initial stage after the liquid crystal injection is not remarkably different from that attained by using an alignment film comprising a polymer having a larger molecular weight, but the deterioration in alignment state after a long period of standing or operation pause is improved in addition to the above-described effect. The reason therefor has not been fully clarified yet but it may be attributable to a factor that a lower molecular weight polymer provides a relatively lower transition temperature (i.e., polymer state relaxation temperature) than a high molecular weight polymer so that the alignment film thereof can be rendered into a structurally more relaxed state when the liquid crystal is injected to be in contact therewith after a thermal treatment and the alignment film is subject to less deterioration with lapse of time thereafter.

In the present invention, it is preferred to use a polymer (or precursor thereof) having an average molecular weight of at most 20,000 in order to allow a larger latitude for selection of a solvent for preparing a polymer (or precursor) solution for forming an alignment film on a substrate.

The use of a polymer having an average molecular weight of at most 10,000, particularly at most 8,000, is further preferred to use a lower temperature for film formation through drying and baking.

Further so say, when an alignment film comprising a polymer having a smaller molecular weight is used within an extent of retaining an adequate film forming characteristic, a higher pretilt angle can be attained by rubbing under identical conditions. On the other hand, a certain pretilt angle can be obtained at a higher rubbing intensity, thus providing an alignment film having a stronger uniaxial characteristic and a homogeneous alignment characteristic over a wider area, compared with the case of using a polymer having a larger molecular weight. In order to attain these effects, it is preferred to use a polymer having an average molecular weight of at most 10,000, more preferably at most 8,000.

The lower limit in molecular weight of the polymer may depend on a structure, and synthesis process facility of the polymer and are not particularly limited. It is however generally preferred to use a polymer having a molecular weight of at least 500, more preferably at least 1000, in order to provide an adequate film formability.

Preferred species of alignment film polymer may include polyamide and polyimide. As a polymer having an average molecular weight of at most 30,000, it is particularly preferred to use a polyimide having a recurring unit represented by the following formula (I) (in its precursor state) or a polyamide having a recurring unit represented by the following formula (II):

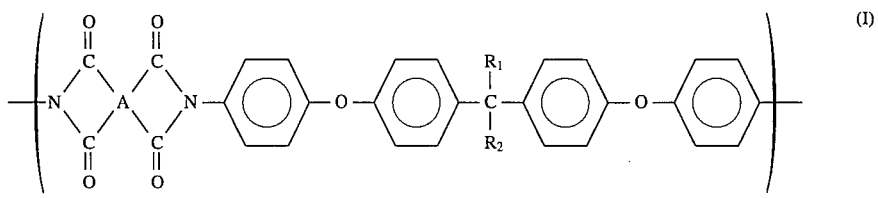

wherein A denotes a tetravalent organic residue group; and $R_1$ and $R_2$ independently denote an alkyl group or fluoroalkyl group having 1–10 carbon atoms; and

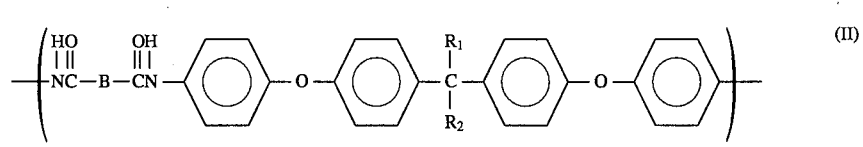

wherein B denotes a divalent organic residue group; and $R_1$ and $R_2$ independently denote an alkyl group or fluoroalkyl group having 1–10 carbon atoms.

The above-mentioned polyimide and polyamide have a good linear polymer chain characteristic and are advantageous in providing an alignment film showing a uniform and improved alignment power over a wide area. They are also advantageous in solvent solubility and in providing an alignment film having a good water or moisture resistant.

Further, by using polymer of the above structure for aligning a chiral smectic liquid crystal, it is possible to provide a higher controlled pretilt angle. Incidentally, the molecular weight of a polyimide as represented by the above formula (I) may be obtained by a GPC measurement with respect to its precursor (polyamide acid).

In the above formula (I), preferred examples of the group A may include those represented by the following formulae:

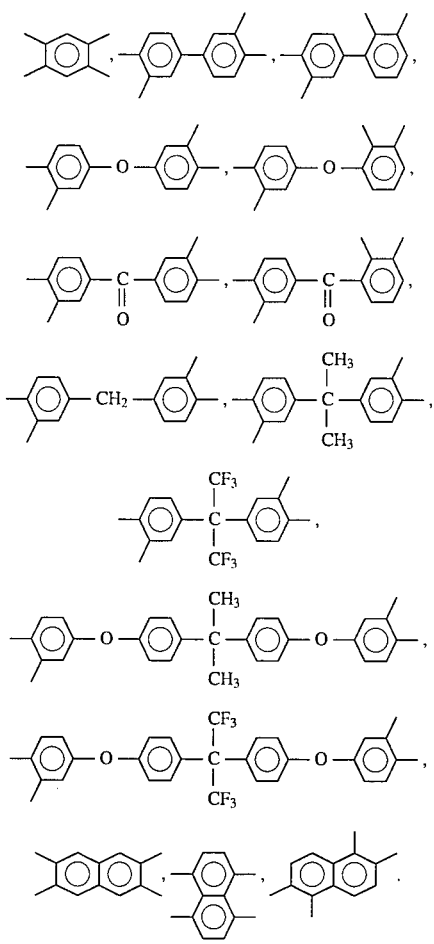

In the above formula (II), preferred examples of the group B may include those represented by the following formulae:

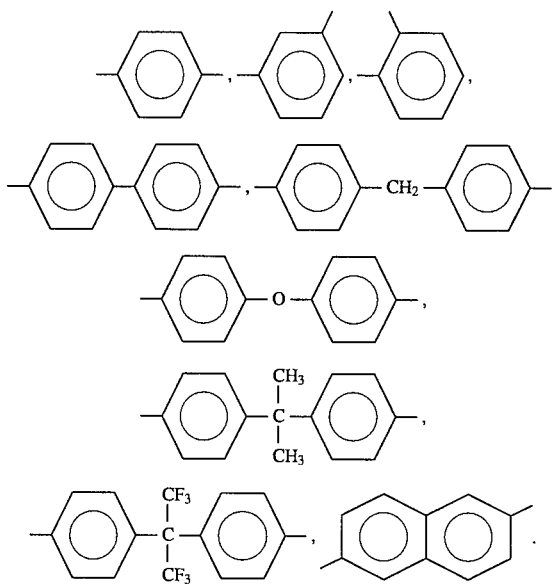

In case of forming an organic alignment film comprising a polyimide, a polyamide acid as a precursor of the polyimide may be dissolved in a solvent, such as dimethylformamide, dimethylacetamide, dimethyl sulfoxide or N-methylpyrrolidone at a concentration of, e.g., 0.01–40 wt. %, and the resultant solution may be applied onto a substrate by spinner coating, spray coating roller coating, etc., followed by heating at 100°–350° C., preferably 200°–300° C., to cause dehydrocyclization to form a polyimide film. In case of forming an alignment film comprising a polyamide, the polyamide may be directly dissolved in a solvent as described above and the resultant solution may be applied similarly as in the case of a polyimide film, followed by heating at 100°–250° C., preferably 150°–220° C., to evaporate the solvent, thereby forming a polyamide film.

The thus-formed organic alignment film may be rubbed with a cloth, etc., as desired.

In the present invention, the organic alignment film may preferably be formed in a thickness of 30 Å–1 μm, preferably 200–2000 Å. In this case, it is possible to omit the use of insulating film 13a and/or 13b shown in FIG. 1.

Alternatively, in case where an organic alignment film is formed on the insulating film 13a and/or 13b, the organic alignment film may be formed in a thickness of at most 200 Å, preferably at most 100 Å.

In case where the polymer having an average molecular weight of at most 30,000 is difficult to apply because of its small molecular weight, it is possible to mix the polymer with another polymer or polymer precursor having a larger molecular weight. Such a higher molecular weight polymer may preferably have an average molecular weight of at most $10^6$, more preferably at most $5 \times 10^5$, in view of its solubility in a solvent and applicability while the upper limit is not basically restricted.

In the present invention, the polymer having an average molecular weight of at most 30,000 may be used in at least one species in a solid content proportion of 5–100 wt. %, preferably 10–100 wt. more preferably 20–100 wt. %, of the total polymer in a polymer or polymer precursor solution for providing a resultant alignment film.

The liquid crystal material used in the present invention may preferably have a phase transition series of isotropic, cholesteric smectic A and chiral smectic on temperature decrease and show ferroelectricity in the chiral smectic phase. In order to provide a good alignment state in chiral smectic phase, it is particularly preferred to use a liquid crystal material showing a pitch of at least 0.8 μm at a mid temperature in its cholesteric temperature range. Specific examples of such a liquid crystal material may include mesomorphic compounds having skeletons (mesogens) comprising a phenyl pyrimidine structure or other heterocyclic rings. Examples of other liquid crystal materials may include liquid crystal materials (1)–(5) below comprising the following liquid crystals [A], [B] and [C] in the indicated proportions by weight.

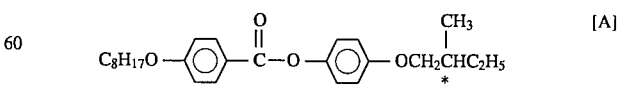
[A]

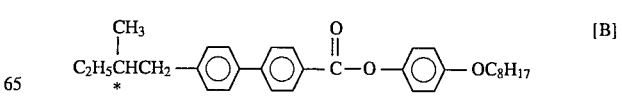
[B]

-continued

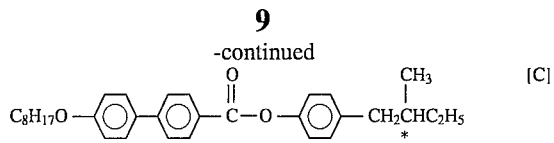

Liquid crystal material
(1) $[A]_{90}/[B]_{10}$
(2) $[A]_{80}/[B]_{20}$
(3) $[A]_{70}/[B]_{30}$
(4) $[A]_{60}/[B]_{40}$
(5) $[C]$ In the liquid crystal device according to the present invention, it is also possible to use a nematic liquid crystal material.

As described above, however, the present invention is most effectively applied to a liquid crystal device using a chiral smectic liquid crystal showing ferroelectricity. Hereinbelow, the operation of a ferroelectric liquid crystal is described in further detail.

Figure 2:
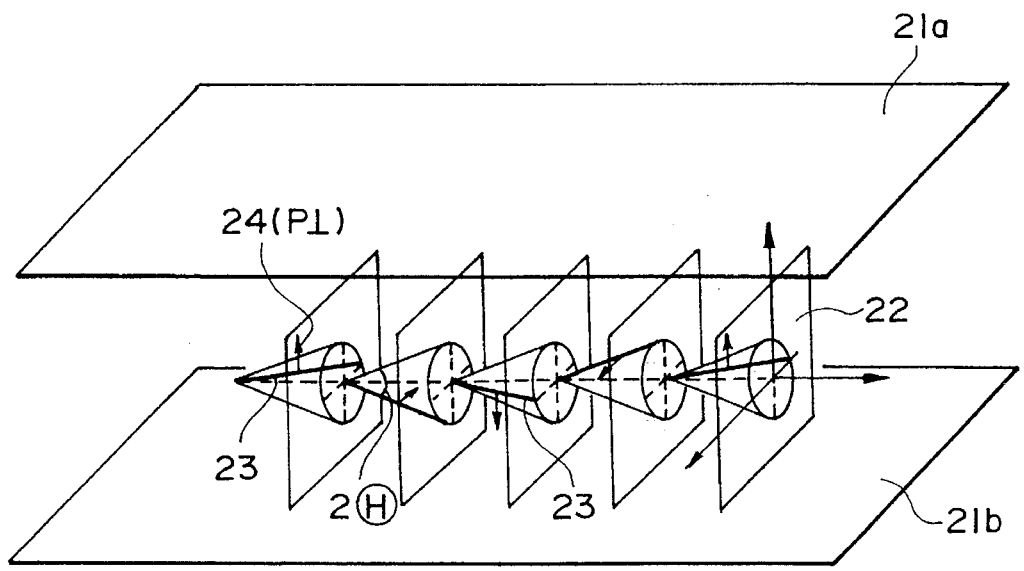
FIG. 2 is a perspective view showing schematically an alignment of a chiral smectic liquid crystal having a helical structure.

FIG. 2 is a schematic illustration of a ferroelectric liquid crystal cell (device) for explaining operation thereof. Reference numerals 21a and 21b denote substrates (glass plates) on which a transparent electrode of, e.g., $In_2O_3$, $SnO_2$, ITO (indium-tin-oxide), etc., is disposed, respectively. A liquid crystal of an SmC*-phase (chiral smectic C phase) or SmH*-phase (chiral smectic H phase) in which liquid crystal molecular layers (smectic layers) 22 are aligned substantially perpendicular to surfaces of the glass plates is hermetically disposed therebetween. Full lines 23 show liquid crystal molecules. Each liquid crystal molecule 23 has a dipole moment (P⊥) 24 in a direction perpendicular to the axis thereof. The liquid crystal molecules 23 continuously form a helical structure in the direction of extension of the substrates. A half of the apex angle of a helical cone in this state is a tilt angle (H) in chiral smectic phase of such a helical structure.

When a voltage higher than a certain threshold level is applied between electrodes formed on the substrates 21a and 21b, a helical structure of the liquid crystal molecule 23 is unwound or released to change the alignment direction of respective liquid crystal molecules 23 so that the dipole moment (P⊥) 24 are all directed in the direction of the electric field. The liquid crystal molecules 23 have an elongated shape and show refractive anisotropy between the long axis and the short axis thereof. Accordingly, it is easily understood that when, for instance, polarizers arranged in a cross nicol relationship, i.e., with their polarizing directions crossing each other, are disposed on the upper and the lower surfaces of the glass plates, the liquid crystal cell thus arranged functions as a liquid crystal optical modulation device of which optical characteristics vary depending upon the polarity of an applied voltage.

Figure 3:
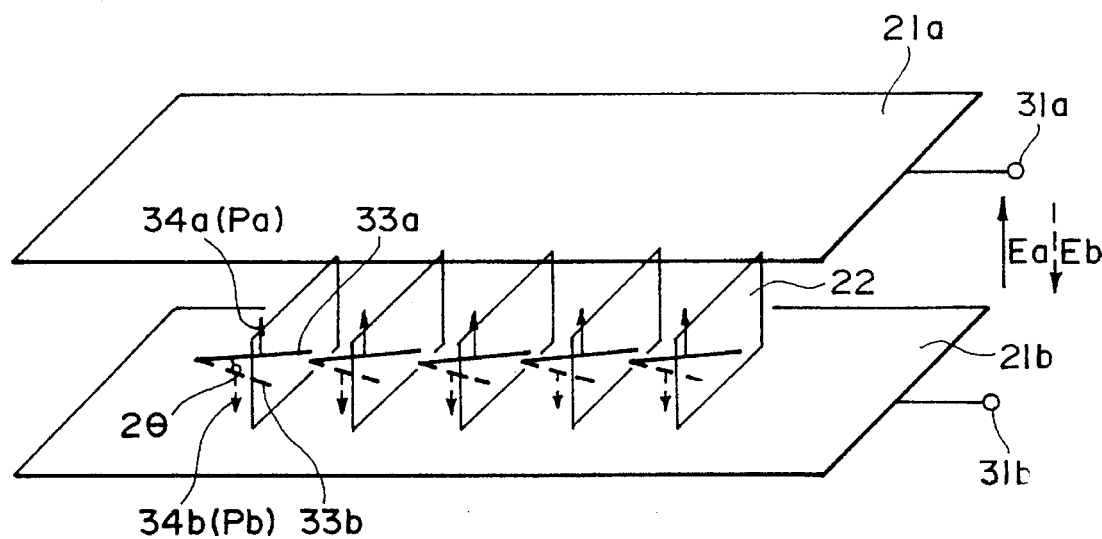
FIG. 3 is a perspective view showing schematically an alignment state of a chiral smectic liquid crystal having a non-helical structure.

Further, when the liquid crystal cell is made sufficiently thin (e.g., 0.1–3 microns), the helical structure of the liquid crystal molecules is unwound to provide a non-helical structure even in the absence of an electric field, whereby the dipole moment assumes either of the two states, i.e., Pa in an upper direction 34a or Pb in a lower direction 34b as shown in FIG. 3.

When an electric field Ea or Eb higher than a certain threshold level and different from each other in polarity as shown in FIG. 3 is applied to a cell having the above-mentioned characteristics by voltage application means 31a and 31b, the dipole moment is directed either in the upper direction 34a or in the lower direction 34b depending on the vector of the electric field Ea or Eb. In correspondence with this, the liquid crystal molecules are oriented in either of a first state 33a and a second state 33b. A half of the angle between the first and second states corresponds to a tilt angle θ.

A first advantage attained by using such a ferroelectric liquid crystal cell is that the response speed is quite fast, and a second advantage is that the orientation of the liquid crystal shows bistability. The second advantage will be further explained, e.g., with reference to FIG. 3. When the electric field Ea is applied to the liquid crystal molecules, they are oriented in the first stable state 33a. This state is stably retained even if the electric field is removed. On the other hand, when the electric field Eb of which direction is opposite to that of the electric field Ea is applied thereto, the liquid crystal molecules are oriented to the second stable state 33b, whereby the directions of molecules are changed. This state is similarly stably retained even if the electric field is removed. Further, as long as the magnitude of the electric field Ea or Eb being applied is not above a certain threshold value, the liquid crystal molecules are placed in the respective orientation states.

FIG. 4 is a schematic sectional view showing an alignment state of liquid crystal molecules attained in an embodiment of the liquid crystal device according to the present invention, and FIG. 5 is a view showing alignment of corresponding C-directors.

Reference numerals 51a and 51b in FIG. 4 denote upper and lower substrates, respectively. Numeral 50 denotes a molecular layer composed of liquid crystal molecules 52, and liquid crystal molecules 52 are aligned so as to change their positions along the bottom face 54 (circular) of a cone 53.

FIG. 5 more specifically shows a change in C-directors. Referring to FIG. 5, at $U_1$ are shown C-directors 81 (each being a projection of a molecular long axis onto an imaginary plane perpendicular to the normal to a molecular layer 50) in one stable orientation state, and at $U_2$ are shown C-directors 81 in the other stable orientation state. In the alignment state shown in FIG. 5, the twist of molecular axes from the upper substrate 51a toward the lower substrate is reduced to provide a larger tilt angle (uniform alignment state).

On the other hand, an alignment state attained by a conventional organic alignment film comprising a larger molecular weight polymer may be represented by a C-director diagram of FIG. 6, which shows an alignment state wherein molecular axes are twisted in a large degree from the upper substrate 51a to the lower substrate 51b to provide a smaller tilt angle θ (splay alignment state).

FIG. 7A is a schematic plan view illustrating a tilt angle θ in an alignment state where C-directors 81 assume a state shown in FIG. 5 (referred to as "uniform alignment state"), and FIG. 7B is a schematic plan view illustrating a tilt angle θ in an alignment state where C-directors 81 assume a state shown in FIG. 6 (referred to as "splay alignment state"). In these figures, reference numeral 60 denotes a rubbing axis provided to the above-mentioned fluorine-containing polyimide film, numeral 61a denotes an average molecular axis in the orientation state $U_1$, numeral 61b denotes an average molecular axis in the orientation state $U_2$, numeral 62a denotes an average molecular axis in the orientation state $S_1$, and numeral 62b denotes an average molecular axis in the orientation state $S_2$. The average molecular axes 61a and 61b can be switched to each other by applying voltages of mutually opposite polarities. Similar switching is caused between the average molecular axes 62a and 62b.

Next, the effectiveness of the uniform alignment state with respect to a delay in optical response (after-image) due to a reverse electric field Vrev is explained.

If the capacitance of an insulating layer constituting a liquid crystal cell is denoted by Ci, the capacitance of a liquid crystal layer is denoted by $C_{LC}$ and the spontaneous polarization of the liquid crystal is denoted by $P_S$, Vrev causing after-image is expressed by the following equation.

$$Vrev=2P_S/(Ci+C_{LC})$$

FIG. 8 is a schematic sectional view illustrating changes in charge distribution direction of $P_S$ and direction of the reverse electric field in a liquid crystal cell. At FIG. 8(a), there is shown a distribution of ⊕ and ⊖ charges in a memory state before application of a pulse electric field, where the spontaneous polarization is directed from ⊕ charges to ⊖ charges. At FIG. 8(b) is shown a state immediately after removal of a pulse electric field, when the direction of the spontaneous polarization $P_S$ is opposite to that shown at FIG. 8(a) (thus, the liquid crystal molecules are inverted from one stable orientation state to the other orientation state) but the distribution of the ⊕ and ⊖ charges is similar to that shown at FIG. 8(a), so that a reverse electric field Vrev is generated as indicated by an arrow shown at FIG. 8(b). The reverse electric field Vrev disappears in a short time to provide a distribution of ⊕ and ⊖ charges as shown at FIG. 8(c).

Figure 10:
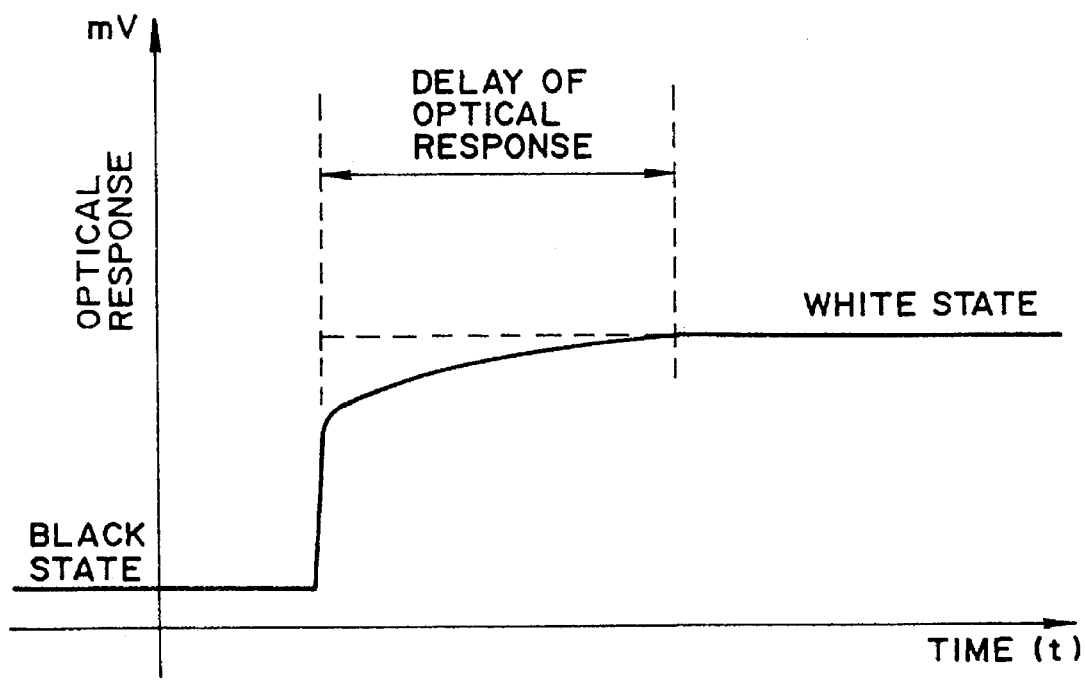
FIGS. 10 and 11 are graphs showing optical response characteristics according to a conventional device and the present invention, respectively.

FIG. 9 is a plan view showing a change in optical response in a splay alignment state given by a conventional high molecular weight polymer alignment film in terms of a change in tilt angle θ. Referring to FIG. 9, at the time of application of a pulse electric field, the orientation of liquid crystal molecules is changed from an average molecular axis S(A) in a splay alignment state to be overshot to an average molecular axis $U_2$ in a uniform alignment state close to that providing a maximum tilt angle Ⓗ along a path denoted by an arrow $X_1$, and immediately after the removal of the pulse electric field, the orientation is changed along a path denoted by an arrow $X_2$ to an average molecular axis S(B) in a splay alignment state providing a decreased tilt angle θ due to the action of the reverse electric field Vrev shown at FIG. 8(b). Then, as the reverse electric field Vrev attenuates as shown at FIG. 8(c), the orientation is changed along a path denoted by an arrow $X_3$ to an average molecular axis S(C) in a splay alignment state providing a stable orientation state having a somewhat increased tilt angle θ. The resultant optical response in this case is shown in FIG. 10, showing a delay.

Figure 11:
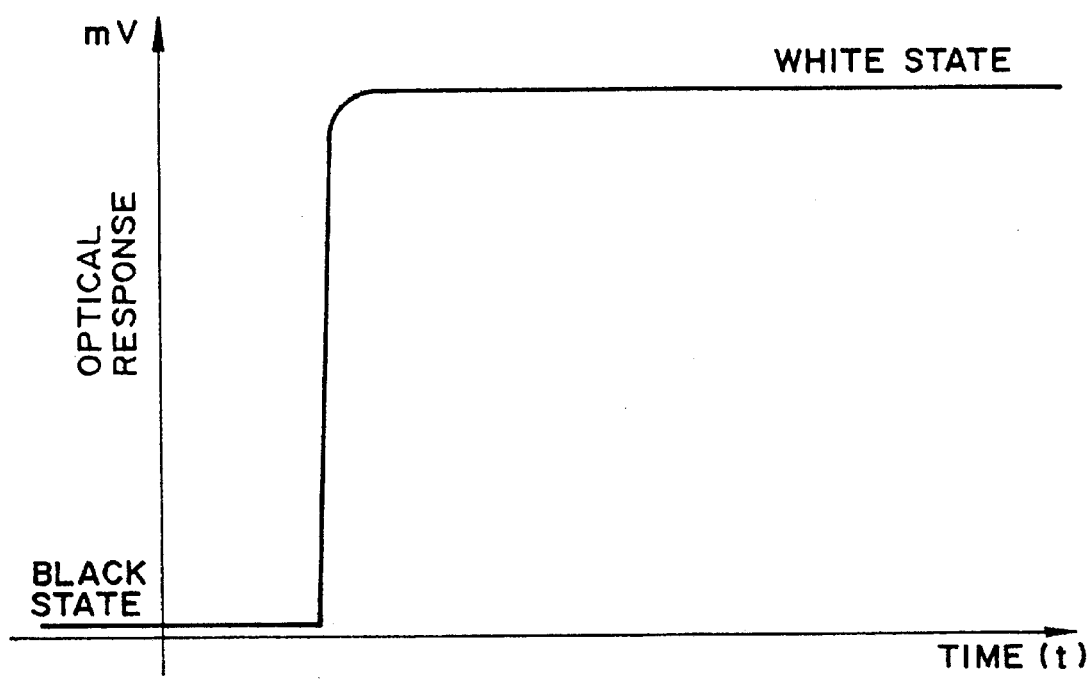

In the alignment state given by using the above-mentioned organic alignment film comprising a specific polymer component of the present invention, the average molecular axes S(A), S(B) and S(C) in the splay alignment state shown in FIG. 9 are not caused but it is possible to form an alignment state with an average molecular axis giving a tilt angle θ which is close to a maximum tilt angle Ⓗ. An optical response at this time according to the present invention is shown in FIG. 11. FIG. 11 shows that a delay in optical response causing after-image is obviated and a high contrast in memory states is caused. In other words, a white state showing a higher transmittance can be realized without a substantial delay after switching from a black state.

The liquid crystal device according to the present invention can constitute various liquid crystal apparatus inclusive of display apparatus and optical shutter. For example, a liquid crystal apparatus 101 having a control system as illustrated by its block diagram shown in FIG. 12 may be constituted by using a liquid crystal device according to the present invention as a display panel 103. FIG. 13 is a time chart illustrating a manner of data communication for transferring image data including scanning line address data and certain data format as illustrated by using a communication synchronizing means based on a SYNC signal.

Figure 12:
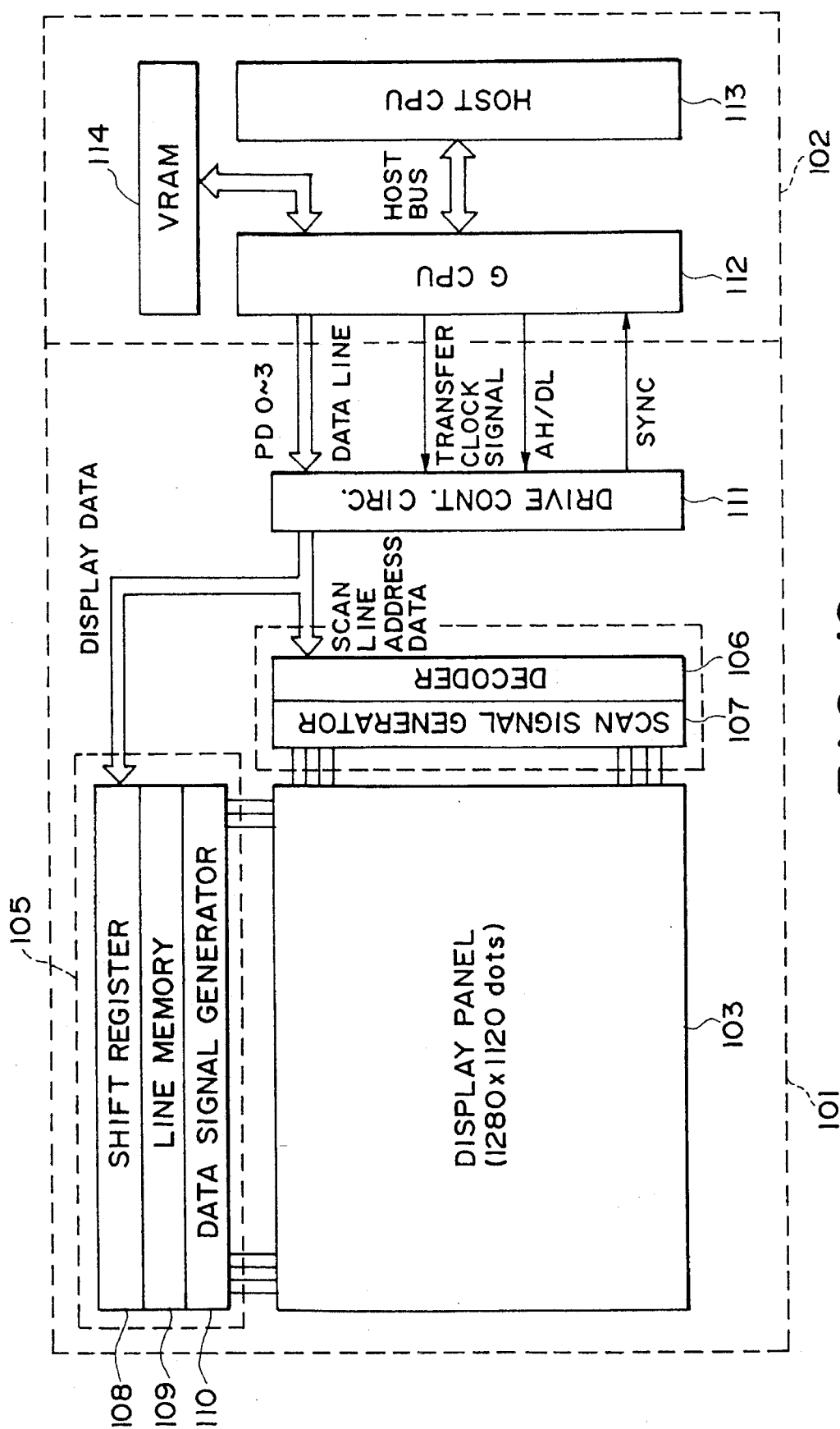
FIG. 12 is a block diagram of a system including a liquid crystal display apparatus equipped with a liquid crystal device according to the invention, and a graphic controller.
Figure 13:
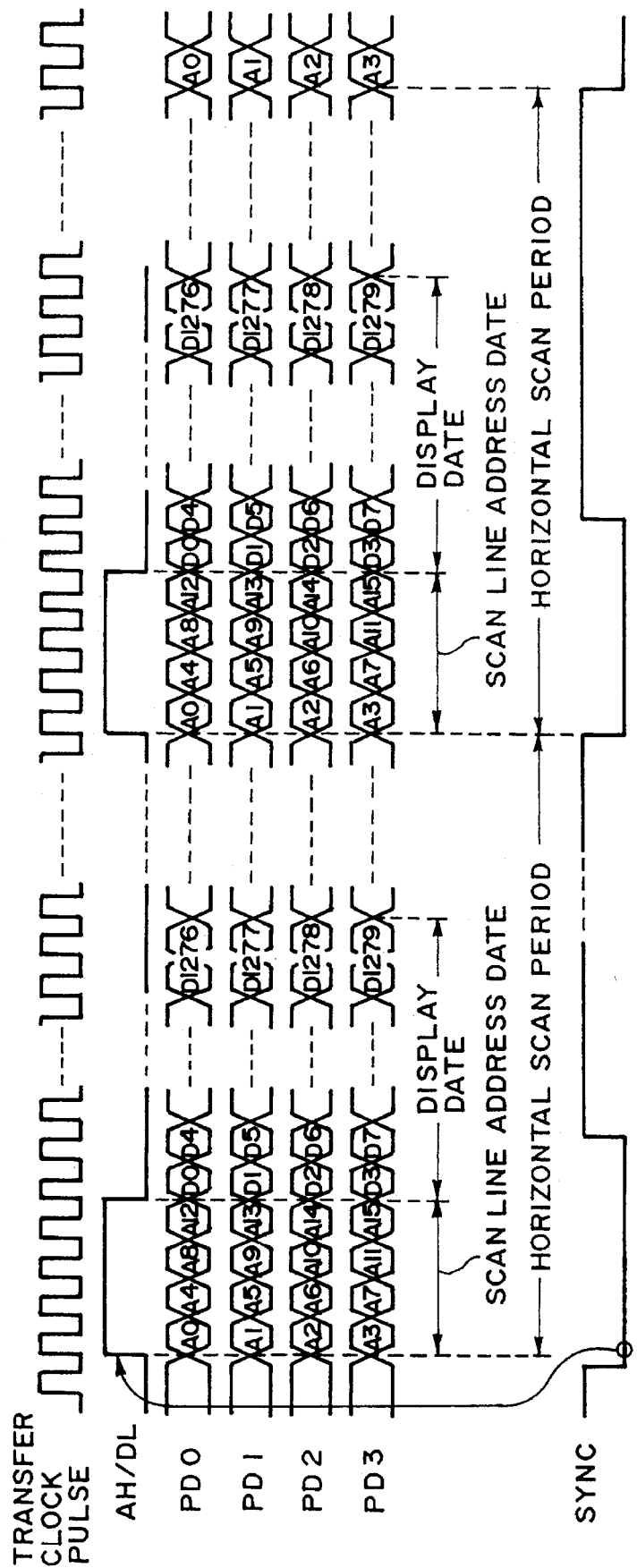
FIG. 13 is a time chart for illustrating image data communication between the liquid crystal display apparatus and the graphic controller shown in FIG. 12.

More specifically, image data is generated from a graphic controller 102 in an apparatus main body and is transferred to the display panel 103 by signal transfer means as illustrated in FIGS. 12 and 13. The graphic controller 102 includes graphic central processing unit (GCPU) 112 and image data storage memory (VRAM) as core units and is in charge of control and communication of image data between a host CPU therein and the liquid crystal display apparatus 101.

Incidentally, a light source (backlight) may be disposed, as desired, behind the display panel.

Hereinbelow, the present invention will be described based on Examples.

Synthesis Example 1

(Synthesis of alignment film material)

Into a 300 ml-separable flask quipped with a stirrer and a nitrogen-introduction pipe and sufficiently dried in advance at 120° C. in a reduced pressure drier, 10.37 g (20 mmol) of 2,2-bis[4-(4-aminophenoxy)phenyl]hexafluoropropane and 60 ml of anhydrous N-methylpyrrolidone also sufficiently dried at 120° C. in a reduced-pressure drier were placed and dissolved with each other at room temperature in a nitrogen atmosphere. Into the flask, 80% of 3.93 g (18 mmol) of pyromellitic acid sufficiently dried at 150° C. in a reduced-pressure drier was first added, and then the remainder of the pyromellitic acid was added little by little in several times. After the addition of the total amount of the pyromellitic acid, 65 ml of anhydrous N-methylpyrrolidone was added, followed further by 30 min. of stirring, to obtain a 10%-N-methylpyrrolidone solution of the corresponding polyamide acid.

The thus-prepared polyamide acid showed a number-average molecular weight (Mn) of 10,000 as a result of GPC measurement.

EXAMPLE 1

Two 1.1 mm-thick glass plates each provided with a 1000 Å-thick ITO film were respectively coated with a 3.0 wt. % solution in a solvent mixture of N-methylpyrrolidone/n-butylcellosolve (=5/1) of a polyamide acid having a recurring unit represented by the following formula having number-average molecular weight of 10000 as measured by gel permeation chromatography (GPC), by means of a spinner coater rotating at 3000 r.p.m.

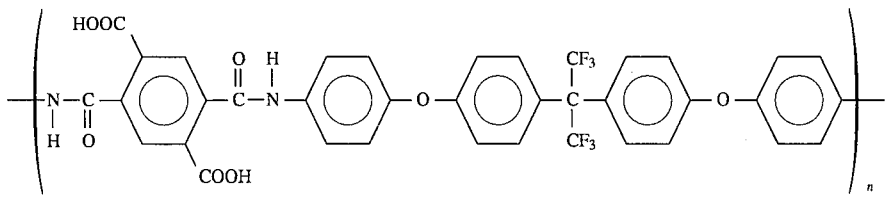

After the coating, the coating films were then baked at 250° C. for about 1 hour to form 450 Å-thick film, which were then rubbed with a nylon-planted cloth in one direction.

On one of the two glass plates thus treated, 1.5 μm-dia. alumina beads were dispersed, and the other glass plate was superposed thereon so that their rubbing axes were parallel to each other and disposed in the same direction to form a blank cell of 3 mm×3 mm.

The blank cell was filled with a ferroelectric smectic liquid crystal ("CS-1014" (trade name), available from Chisso K.K.) under vacuum and, after sealing, was gradually cooled from isotropic phase at a rate of 0.5° C./min. to 30° C., whereby an alignment was effected. The "CS-1014" liquid crystal in the cell showed the following phase transition series.

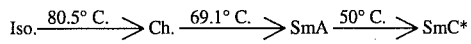

Iso.: isotropic phase,
Ch.: cholesteric phase,
SmA: smectic A phase,
SmC*: chiral smectic C phase.

The above-prepared liquid crystal cell was sandwiched between a pair of 90 degrees-cross nicol polarizers to provide a liquid crystal device and was supplied with a pulse of 50 μsec and 30 V. Then, the cross nicol polarizers were set at the extinction position (providing the darkest state), and the transmittance through the liquid crystal device at this time was measured by a photo-multiplier. Then, a pulse of 50 μsec and −30 V was applied to the device, and the transmittance (brightest state) at this time was measured in the same manner, whereby the following data were obtained.

Tilt angle θ=about 15 degrees, transmittance in the brightest state=39%, transmittance in the darkest state=1%, contrast ratio=39:1.

The delay in optical response causing after-image measured as a time until a constant transmitted light intensity was at most 0.2 sec.

Figure 14:
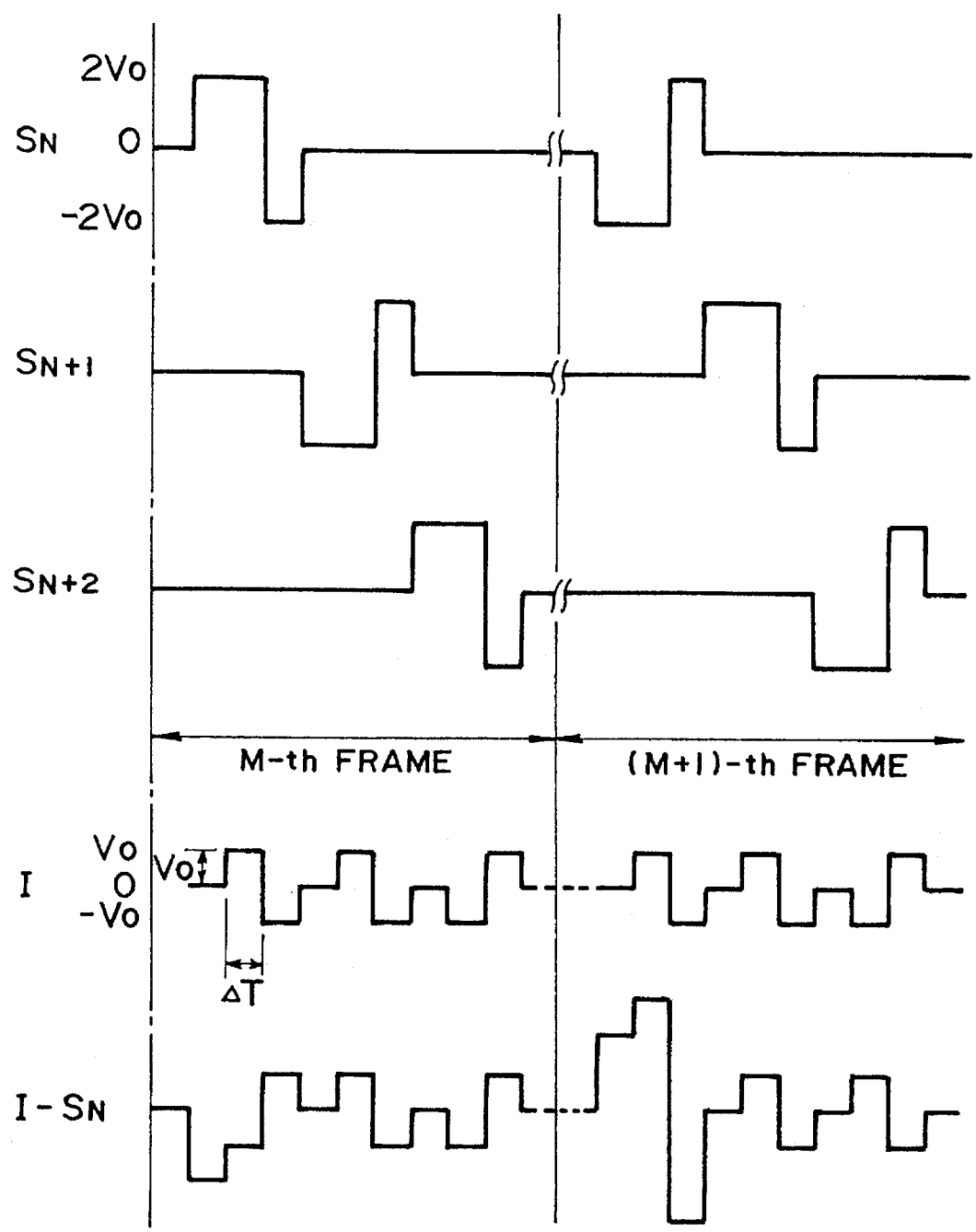
FIG. 14 is a waveform diagram illustrating driving waveforms used in an embodiment of the present invention.

The liquid crystal device was subjected to multiplexing drive for display using driving waveforms shown in FIG. 14, whereby a high-quality display with a high contrast was attained. Further, after an image display of a prescribed character image, the whole picture area was erased into "white", whereby no after-image was recognized. Referring to FIG. 14, at $S_N$, $S_{N+1}$ and $S_{N+2}$ are shown voltage waveforms applied to scanning lines, at I is shown a voltage waveform applied to a representative date line, and at (I-$S_N$) is shown a combined voltage waveform applied to the data line I and the scanning line $S_N$. In the above embodiment, the drive was performed under the conditions of $V_O$=5–8 volts and ΔT=20–70 μsec.

EXAMPLES 2 and 3

Liquid crystal cells were prepared in the same manner as in Example 1 except that the alignment films were prepared from the corresponding polyamide acids having number-average molecular weights (Mn) of 8000 (Example 2) and 5000 (Example 3).

The respective cells thus prepared were evaluated in the same manner as in Example 1, whereby the following contrast ratios and optical response delay time were measured.

|  | Mn | Contrast ratio | Delay time (sec) |
|---|---|---|---|
| Example 2 | 8000 | 39:1 | 0.1 |
| Example 3 | 5000 | 42:1 | 0.1 |

As a result of multiplexing drive in the same manner as in Example 1, the respective cells showed good results with respect to contrast and after-image similarly as in Example 1.

Comparative Example 1

A liquid crystal cell was prepared in the same manner as in Example 1 except that the alignment films were prepared from the corresponding polyamide acid having a number-average molecular weight (Mn) of 50,000.

The resultant cell was evaluated in the same manner to show a contrast ratio of 31:1 and an optical response delay time of 0.2 sec.

[Alignment characteristic change with time]

Two additional comparative cells were prepared in the same manner as in Example 1 except that the alignment films were prepared from the corresponding polyamide acids having different molecular weights, i.e., Mn 39,000 (Comparative Example 2) and Mn=31,000 (Comparative Example 3).

These cells and also the cells of Examples 1–3 and Comparative Example 1 were subjected to evaluation of alignment state by observation through an optical microscope both immediately after the preparation and after standing for 1500 hours in a desicator at room temperature. More specifically, a display state including a white region and a black region in equal areas was formed and observed through an optical microscope with respect the change in display state and an alignment state at the boundary immediately after the formation of the display state and after the standing for 1500 hours.

The results are summarized in the following Table 1.

TABLE 1

|  |  | Alignment state | |
|---|---|---|---|
|  | Mn | Initial | After 1500 hrs. |
| Comp. Ex. | | | |
| 1 | 50000 | ⊙ | Δ |
| 2 | 39000 | ⊙ | Δ |
| 3 | 31000 | ⊙ | ○ |

TABLE 1-continued

| | | Alignment state | |
|---|---|---|---|
| | Mn | Initial | After 1500 hrs. |
| Example | | | |
| 1 | 10000 | ⊚ | ⊚ |
| 2 | 8000 | ⊚ | ⊚ |
| 3 | 5000 | ⊚ | ⊚ |

The evaluation of the alignment state summarized in the above Table 1 was performed according to the following standards. ⊚: The black and white regions were in equal areas and retained a clear boundary. o: The black and white regions were in substantially equal areas but caused a local inversion, and the boundary therebetween was disordered. Δ: Local inversion occurred in each of the black and white regions.

As is understood from the above-described results, the liquid crystal device according to the present invention including an alignment film formed by using a polyamide acid having a smaller molecular weight of at most 30,000 showed an improved contrast, a reduced delay in optical response and an improved alignment state, particularly a display state-maintaining effect even after a long period of storage.

[Larger size cell preparation]

Liquid crystal cells of a larger size (300 mm ×300 mm) were prepared under the conditions corresponding to the above Examples 1–3 and Comparative Example 3 except that the rubbing intensities were adjusted so as to provide a substantially equal pretilt angle.

The respective cells were observed through an optical microscope with respect to the homogeneity of alignment state after the cell preparation over the extension of cell area. The results are summarized in the following Table 2.

TABLE 2

| | Mn | Homogeneity of alignment |
|---|---|---|
| Comp. Ex. 3 | 31000 | Δ |
| Example 1 | 10000 | o |
| Example 2 | 8000 | ⊚ |
| Example 3 | 5000 | ⊚ |

The evaluation standards were as follows. Δ: Local contrast irregularity was observed. o: Partial irregularity was observed at cell edges. ⊚: Homogeneous alignment state was observed over the entire extension of the cell.

EXAMPLES 4–12

Liquid crystal cells were prepared in the same manner as in Example 1 except that the alignment films were prepared from the polymer materials (alignment film materials or precursors thereof) shown below and the above-mentioned liquid crystal mixture (3) ([A]:[B]=70:30 by weight) was used in Examples 6, 7, 10 and 11 instead of the ferroelectric liquid crystal ("CS-1014", mfd. by Chisso K.K.) used in the other Examples.

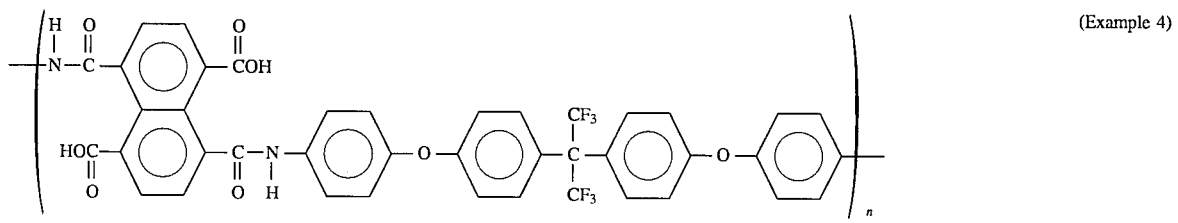

(Example 4)

Mn = 15,000

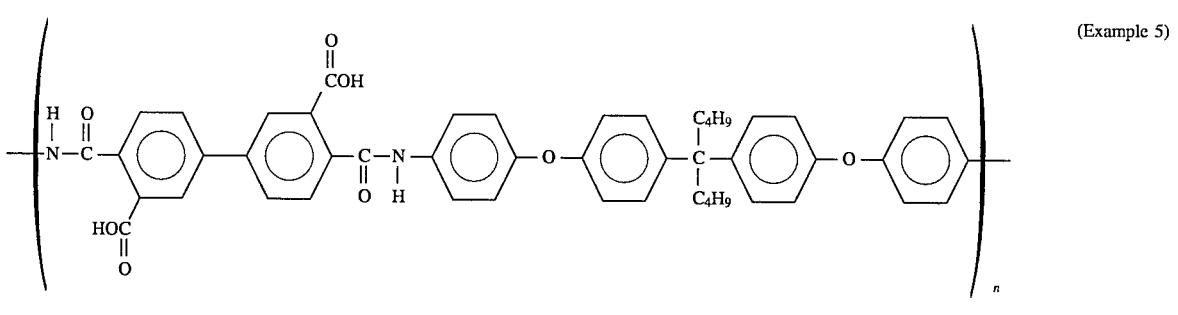

(Example 5)

Mn = 12,000

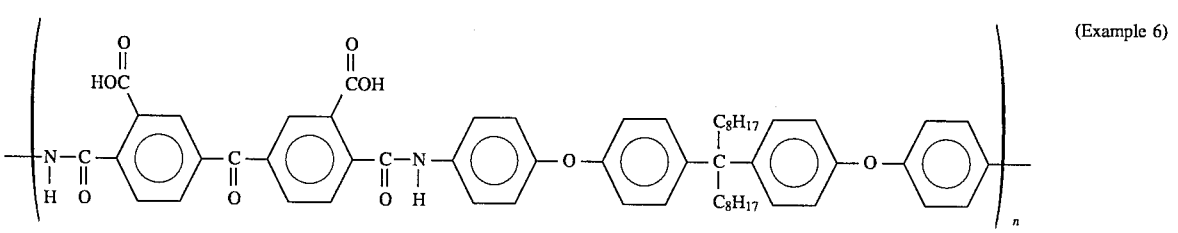

(Example 6)

Mn = 18,000

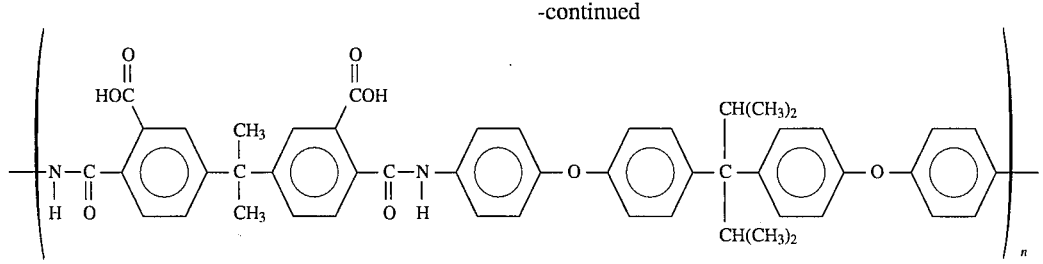
(Example 7)

Mn = 22,000

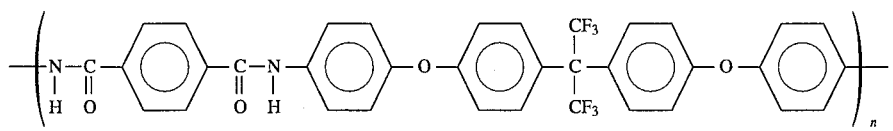
(Example 8)

Mn = 16,000

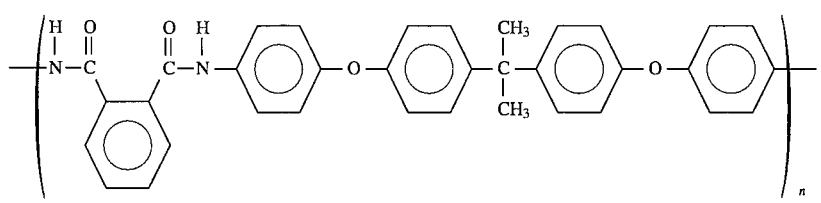
(Example 9)

Mn = 12,000

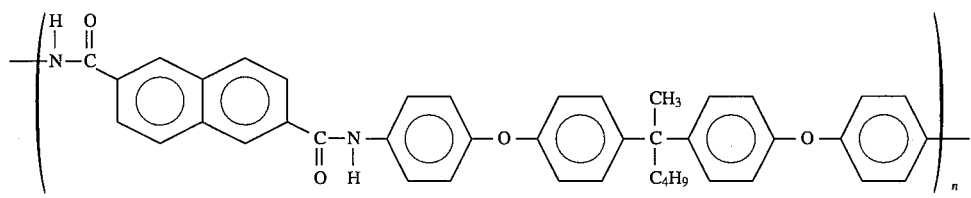
(Example 10)

(Mn = 8,000)

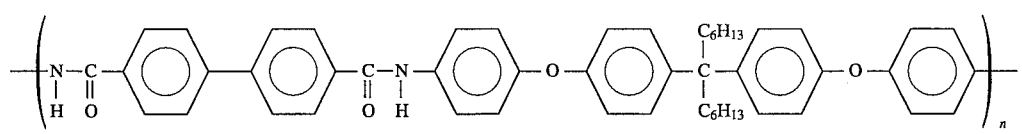
(Example 11)

Mn = 10,000

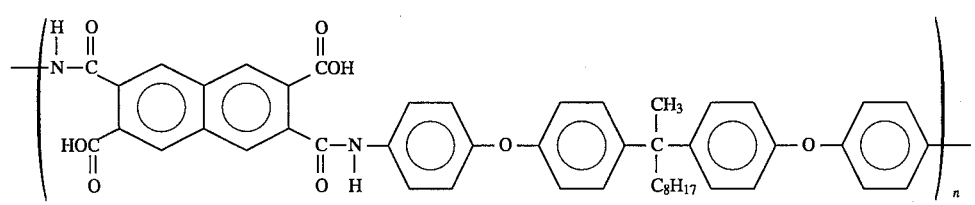
(Example 12)

Mn = 6,000

The respective cells thus prepared were evaluated in the same manner as in Example 1, thereby to show contrast ratios and optical response delay time as shown in Table 3 appearing hereinafter.

Further, as a result of multiplexing drive in the same manner as in Example 1, the respective cells showed good results similarly as in Example 1 with respect to contrast and after-image.

EXAMPLES 13–15

Liquid crystals were prepared in the same manner as in Example 1(including the use of the same ferroelectric liquid crystal ("CS-1014", mfd. by Chisso K.K.)) except that the alignment films were prepared from mixture materials (13A and 13B for Example 13, 14A and 14B for Example 14, and 15A and 15B for Example 15) respectively shown below in indicated mixing ratios by weight.

(Example 13)
[13A]

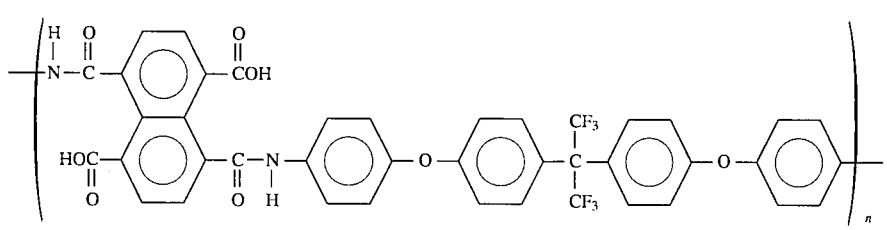

Mn = 8,000

[13B]

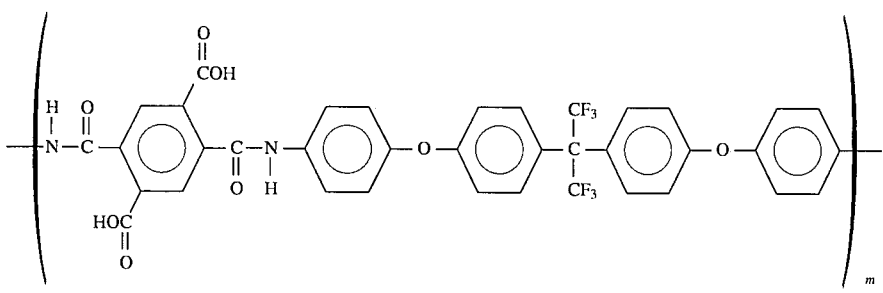

[13A]/[13B] = 25/75     Mn = 50,000

(Example 14)
[14A]

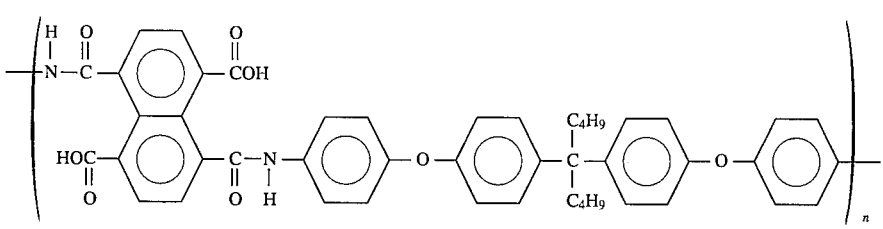

Mn = 15,000

[14B]

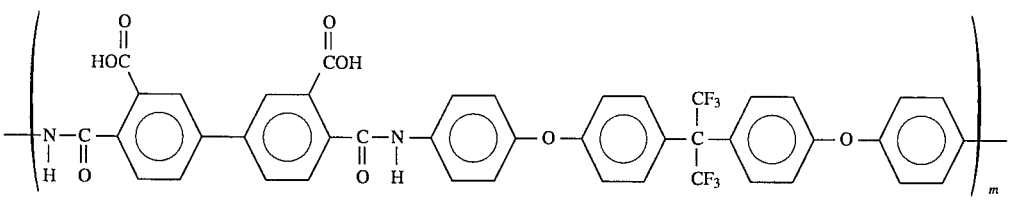

[14A]/[14B] = 50/50     Mn = 70,000

(Example 15)
[15A]

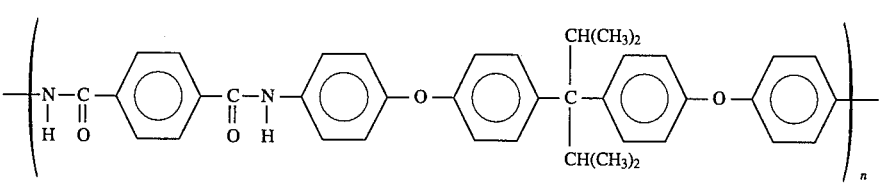

Mn = 18,000

[15B]

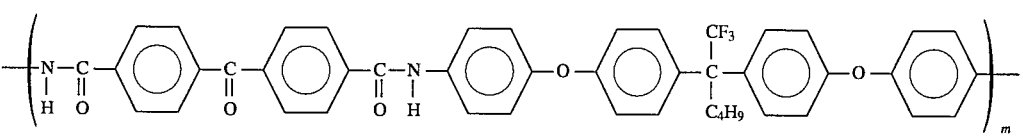

[15A]/[15B] = 50/50     Mn = 55,000

The respective cells thus prepared were evaluated in the same manner as in Example 1, thereby to show contrast ratios and optical response delay time as shown in Table 3 appearing hereinafter.

Further, as a result of multiplexing drive in the same manner as in Example 1, the respective cells showed good results similarly as in Example 1 with respect to contrast and after-image.

As is understood from the results of Examples 13–15, it is understood to be possible to appropriately control the alignment control characteristic and effect on the switching characteristic of an alignment film by using a mixture polymer including a polymer component having an average molecular weight of at most 30,000 and a polymer component having an average molecular weight exceeding 30,000. Further, the polymer mixtures used in these Examples were found to have better film forming characteristic including applicability of the solution.

TABLE 3

| Example | Contrast ratio | Optical response delay time (sec) |
|---|---|---|
| 4 | 47:1 | 0.2 |
| 5 | 43:1 | 0.1 |
| 6 | 40:1 | 0.1 |
| 7 | 36:1 | 0.2 |
| 8 | 32:1 | 0.2 |
| 9 | 30:1 | 0.2 |
| 10 | 33:1 | 0.2 |
| 11 | 32:1 | 0.2 |
| 12 | 46:1 | 0.1 |
| 13 | 49:1 | 0.2 |
| 14 | 47:1 | 0.1 |
| 15 | 35:1 | 0.2 |

As described above, according to the present invention, it is possible to provide an liquid crystal device wherein the liquid crystal is aligned in a homogeneous alignment state. The liquid crystal device thus obtained shows a high contrast between the bright and dark states and provides high-quality displays showing a high contrast and free from after-image.

What is claimed is:

1. A liquid crystal device, comprising: a pair of substrates disposed in parallel with each other and each having an electrode thereon, and a liquid crystal assuming chiral smectic phase disposed between the substrates; at least one of the substrates having thereon an organic alignment film comprising (i) at least one species of polymer having an average molecular weight of at most 30,000 and (ii) at least one species of polymer having an average molecular weight exceeding 30,000.

2. A device according to claim 1, wherein said at least one species of polymer has an average molecular weight of at most 10,000.

3. A device according to claim 1, wherein said at least one species of polymer has an average molecular weight of at most 8,000.

4. A device according to claim 1, wherein said polymer having an average molecular weight of at most 30,000 comprises a polyimide having a recurring unit represented by the following formula (I):

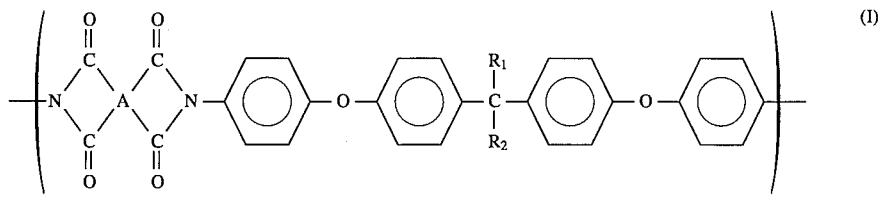

wherein A denotes a tetravalent organic residue group; and $R_1$ and $R_2$ independently denote an alkyl group or fluoroalkyl group having 1–10 carbon atoms.

5. A device according to claim 1, wherein said polymer having an average molecular weight of at most 30,000 comprises a polyamide having a recurring unit represented by the following formula (II):

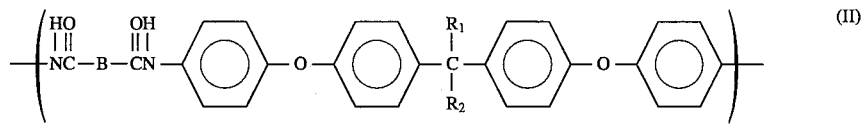

wherein B denotes a divalent organic residue group; and $R_1$ and $R_2$ independently denote an alkyl group or fluoroalkyl group having 1–10 carbon atoms.

6. A device according to claim 1, wherein said liquid crystal is a ferroelectric liquid crystal.

7. A liquid crystal device according to claim 1, wherein the alignment film has been subjected to a uniaxial aligning treatment.

8. A liquid crystal apparatus including a liquid crystal device according to any one of claims 1–3, 4, 5, 6 or 7.

9. A liquid crystal display apparatus including a liquid crystal device according to any one of claims 1–3, 4, 5, 6 or 7.

10. A device according to claim 1, wherein said liquid crystal is disposed in a thickness small enough to unwind a helical structure inherent to the chiral smectic phase of the liquid crystal.

* * * * *

UNITED STATES PATENT AND TRADEMARK OFFICE
CERTIFICATE OF CORRECTION

PATENT NO. : 5,587,211
DATED : December 24, 1996
INVENTOR(S) : TAKESHI TOGANO ET AL.

Page 1 of 3

It is certified that error appears in the above-identified patent and that said Letters Patent is hereby corrected as shown below:

COLUMN 1

Line 22, "127-." should read --127-128.--.
    Line 32, "crystal" should read --crystal as disclosed--.
    Line 33, "1021-." should read --1021-1023.--.
    Line 49, "and" should read --or--.

COLUMN 2

Line 37, "tile" should read --tilt--.

COLUMN 3

Line 19, "characteristic" should read --Characteristic--.
    Line 32, "constitution" should read --use in--.

COLUMN 4

Line 59, "formed" should read --found--.
    Line 64, "in case" should read --in the case--.

COLUMN 5

Line 1, "in case" should read --in the case--.
    Line 14, "0.6" should read --0.06--.
    Line 15, "0,004" should read --0.004--.
    Line 24, "In case" should read --In the case--.

COLUMN 6

Line 5, "so" should read --to--.
    Line 24, "polymer" should read --polymers--.

UNITED STATES PATENT AND TRADEMARK OFFICE
CERTIFICATE OF CORRECTION

PATENT NO.  : 5,587,211
DATED       : December 24, 1996
INVENTOR(S) : TAKESHI TOGANO ET AL.         Page 2 of 3

It is certified that error appears in the above-identified patent and that said Letters Patent is hereby corrected as shown below:

COLUMN 8

Line 1, "In case" should read --In the case--.
Line 7, "spray coating" should read --spray coating,--.
Line 9, "In case" should read --In the case--.
Line 23, "in case" should read --in the case--.
Line 27, "In case" should read --In the case--.

COLUMN 10

Line 1, "and" should read --or--.

COLUMN 13

Line 11, "film," should read --films--.

COLUMN 20

Example [15B], "$CF_3$" should read --$CH_3$--.

COLUMN 21

Line 2, "understood to be" should be deleted.
Line 9, "characteristic" should read --characteristics--.
Line 58, "1-3, 4, 5, 6 or 7." should read --1-7 or 10.--.

UNITED STATES PATENT AND TRADEMARK OFFICE
CERTIFICATE OF CORRECTION

PATENT NO. : 5,587,211
DATED : December 24, 1996
INVENTOR(S) : TAKESHI TOGANO ET AL.

It is certified that error appears in the above-identified patent and that said Letters Patent is hereby corrected as shown below:

COLUMN 22

Line 50, "1-3, 4, 5, 6 or" should read --1-7 or 10.--.
Line 51, "7." should be deleted.

Signed and Sealed this

Seventeenth Day of June, 1997

BRUCE LEHMAN

Attest:

Attesting Officer

Commissioner of Patents and Trademarks